US008787356B2

(12) United States Patent
Lee et al.

(10) Patent No.: US 8,787,356 B2
(45) Date of Patent: Jul. 22, 2014

(54) APPARATUS AND METHOD FOR PROVIDING OTHER SERVICE IN IP MULTIMEDIA SUBSYSTEM (IMS)

(75) Inventors: Shi-Jae Lee, Suwon-si (KR); Young-Ki Jeon, Hwaseong-si (KR); Joon-Ho Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 12/623,706

(22) Filed: Nov. 23, 2009

(65) Prior Publication Data
US 2010/0128721 A1 May 27, 2010

(30) Foreign Application Priority Data

Nov. 27, 2008 (KR) .......................... 10-2008-0118684

(51) Int. Cl.
*H04L 12/66* (2006.01)
*H04L 12/28* (2006.01)

(52) U.S. Cl.
USPC .......................................... 370/352; 370/401

(58) Field of Classification Search
None
See application file for complete search history.

(56) References Cited

U.S. PATENT DOCUMENTS

| 8,265,090 | B2* | 9/2012 | Cai et al. .................. 370/410 |
| 2006/0291488 | A1* | 12/2006 | Naqvi et al. ............... 370/401 |
| 2006/0291489 | A1* | 12/2006 | Naqvi et al. ............... 370/401 |
| 2008/0263137 | A1* | 10/2008 | Pattison et al. ............. 709/203 |
| 2009/0016325 | A1* | 1/2009 | Al-Bakri .................. 370/352 |
| 2009/0017796 | A1* | 1/2009 | Foti ....................... 455/414.1 |
| 2009/0086740 | A1* | 4/2009 | Al-Bakri et al. ............ 370/401 |
| 2009/0168758 | A1* | 7/2009 | Apelqvist et al. ........... 370/352 |
| 2009/0175426 | A1* | 7/2009 | Beyer et al. ............... 379/93.02 |
| 2009/0190573 | A1* | 7/2009 | Siegel et al. ............... 370/352 |
| 2009/0190603 | A1* | 7/2009 | Damola et al. ............. 370/401 |
| 2009/0191871 | A1* | 7/2009 | Siegel et al. ............... 455/435.1 |
| 2009/0191873 | A1* | 7/2009 | Siegel et al. ............... 455/435.2 |
| 2010/0232402 | A1* | 9/2010 | Przybysz .................. 370/338 |
| 2010/0246536 | A1* | 9/2010 | Della-Torre et al. ......... 370/335 |
| 2011/0028130 | A1* | 2/2011 | Swaminathan et al. ...... 455/414.1 |
| 2012/0307734 | A1* | 12/2012 | Cai et al. .................. 370/328 |

* cited by examiner

*Primary Examiner* — Suk Jin Kang
(74) *Attorney, Agent, or Firm* — Jefferson IP Law, LLP (57) ABSTRACT

An apparatus and a method for providing other Voice over Internet Protocol (VoIP) services (e.g., Skype, Google talk, and the like) using a terminal which supports an IP Multimedia Subsystem (IMS) network are provided. The apparatus includes an interworking apparatus for converting information received from a VoIP service network to information supportable by an IMS terminal to interwork the IMS terminal and other VoIP services not supported by the IMS terminal, and converting information received from the IMS terminal to information supportable by a VoIP service network.

15 Claims, 5 Drawing Sheets

FIG.5

APPARATUS AND METHOD FOR PROVIDING OTHER SERVICE IN IP MULTIMEDIA SUBSYSTEM (IMS)

PRIORITY

This application claims the benefit under 35 U.S.C. §119(a) of a Korean patent application filed in the Korean Intellectual Property Office on Nov. 27, 2008 and assigned Serial No. 10-2008-0118684, the entire disclosure of which is hereby incorporated by reference.

BACKGROUND OF THE INVENTION

1. Field of the Invention

The present invention relates to a mobile communication system. More particularly, the present invention relates to an apparatus and a method for providing other Voice over Internet Protocol (VoIP) services (e.g., Skype, Google talk, and the like) using a terminal which supports an IP Multimedia Subsystem (IMS) network.

2. Description of the Related Art

In accordance with rapid advances of the communication technology, a conventional voice service has come to provide a portable terminal with a high-speed data service which enables multimedia services such as e-mail, still images, videos, and the like.

Third ($3^{rd}$) Generation (3G) mobile communication systems, which support both of the conventional voice service and a packet service, include a Code Division Multiple Access (CDMA) 2000-1x system using a synchronous scheme and a Universal Mobile Telecommunications System (UMTS) using an asynchronous scheme, which are widely known. The 3G mobile communication systems provide the multimedia services to the portable terminal through the interworking between the IMS network and other networks.

A portable terminal that allows interworking between the IMS network and the other networks is a multimode portable terminal that is capable of using the voice data service in a circuit switch network such as the UMTS and a Global System for Mobile communications (GSM), and using the Voice over Internet Protocol (VoIP) services in a Wireless Local Area Network (WLAN) environment.

The most recent IP Multimedia Subsystem (IMS) is the Release 9 standard which is issued by the 3G Partnership Project (3GPP), the standards body of the 3G mobile communication systems.

The IMS is a network for effectively supporting wireless data demands that are rapidly increasing in mobile communication networks and multimedia services while still supporting the existing voice service. The IMS network complies with a Session Initiation Protocol (SIP) for control signals and message deliveries between the network components.

For the IMS service as described above, users can use the IMS service only through a terminal equipped with an IMS client.

This is the basic precondition required by not only the IMS service but also most of the VoIP services. To use the VoIP service such as Skype, the terminal equipped with a client (e.g., Skype client, and the like) corresponding to the service is required. However, to install the client, the terminal must be a high performance terminal, which increases the cost.

This is because the VoIP service, which is based on peer-to-peer communication, requires considerable abilities of the client, unlike the IMS service which is based on the communication between a server and a client.

The peer-to-peer communication service attracts subscribers with its low communication fee, but has to use the high-cost terminal to install the client corresponding to the VoIP service.

The VoIP service for the presence based peer-to-peer communication is subject to the traffic for presence information and thus a large volume of traffic increases battery consumption even though the mobile communication terminal is not connected to the corresponding service.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing other Voice over Internet Protocol (VoIP) services (e.g., Skype, Google talk, and the like) using a terminal which supports an IP Multimedia Subsystem (IMS) network.

Another aspect of the present invention is to provide an apparatus and a method for reducing battery consumption by providing a VoIP service in an IMS.

Yet another aspect of the present invention is to provide a service interworking apparatus and method for authenticating an IMS network and a VoIP network to provide a VoIP service in an IMS.

In accordance with an aspect of the present invention, an apparatus for providing another service in an IMS is provided. The apparatus includes a service interworking apparatus for converting information received from a VoIP service network to information supportable by an IMS terminal to interwork the IMS terminal and other VoIP services not supported by the IMS terminal, and for converting information received from the IMS terminal to information supportable by the VoIP service network.

In accordance with another aspect of the present invention, a method for providing the other service in an IMS is provided. The method includes converting information received from a VoIP service network to information supportable by an IMS terminal and transmitting the converted information to the IMS terminal to interwork the IMS terminal and other VoIP services not supported by the IMS terminal, and converting information received from the IMS terminal to information supportable by the other VoIP service network and transmitting the converted information to the VoIP service network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for providing an interworking service which provides other Voice over Internet Protocol (VoIP) services (e.g., Skype, Google talk, and the like) using a terminal which supports an IP Multimedia Subsystem (IMS) network.

Figure 1:
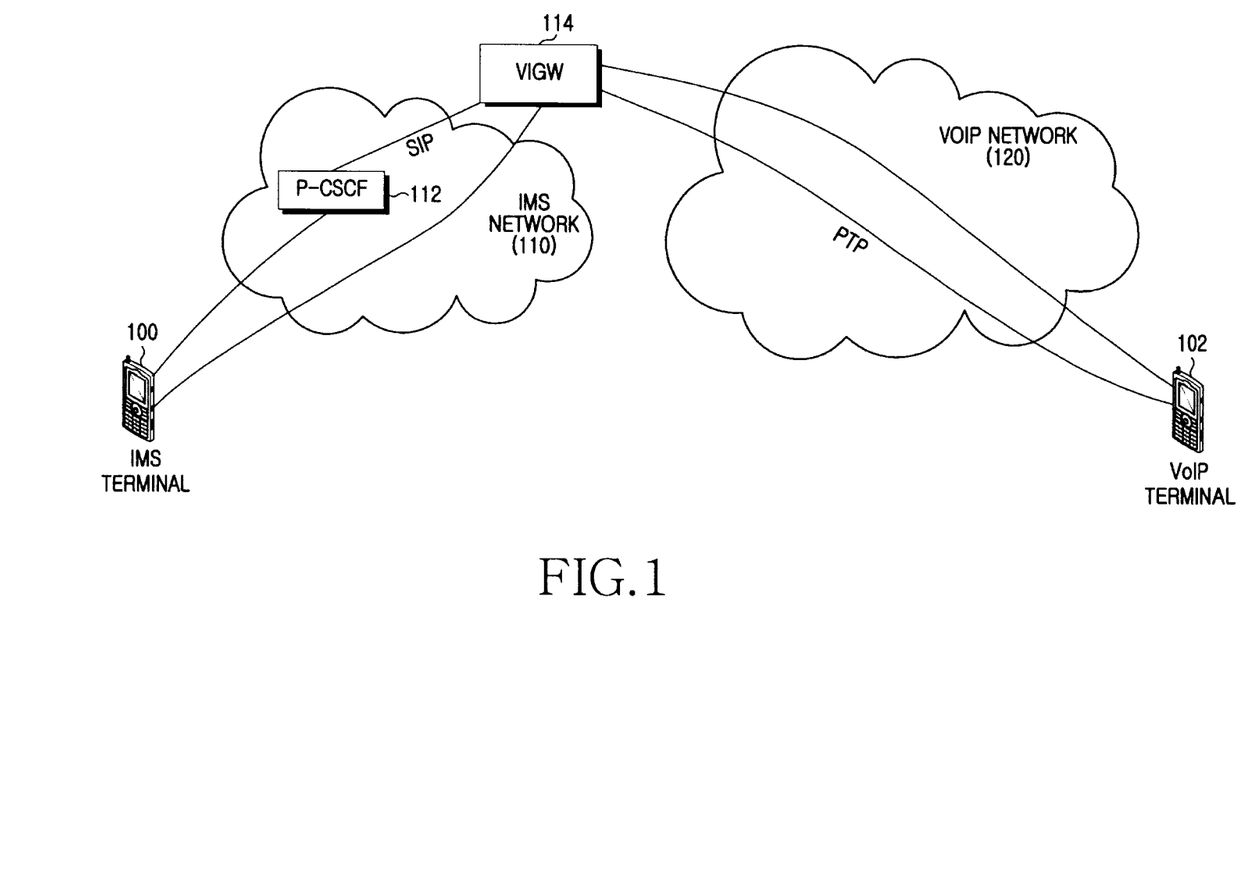
FIG. 1 is a simplified diagram of an interworking service process of a mobile communication system according to an exemplary embodiment of the present invention.

FIG. 1 is a simplified diagram of an interworking service process of a mobile communication system according to an exemplary embodiment of the present invention.

Referring to FIG. 1, a mobile communication system may include an IMS terminal 100, a Proxy-Call Session Control Function (P-CSCF) 112, a service interworking apparatus 114, and a VoIP terminal 102.

The IMS terminal 100 of the mobile communication system is a terminal which supports only the IMS service through IMS network 110 as discussed earlier. It is assumed that a user of the terminal is subscribed to the VoIP service (Skype, Google talk, and the like) other than the IMS service. Accordingly, the user of the terminal is not serviced through the IMS but may use VoIP, presence, message service, and so on from the currently subscribed VoIP service. While the terminal supports only the IMS service, it provides the user with the same User Interface (UI) as provided by the corresponding VoIP service terminal.

To use the interworking service, that is, the other service at the IMS terminal, the IMS terminal 100 registers with the interworking apparatus 114 through the P-CSCF 112.

After the registration with the IMS terminal 100, the service interworking apparatus 114 accesses a VoIP service network 120. Herein, the access of the VoIP service network 120 indicates a log-on process to the VoIP service using access information required for the VoIP service access received from the terminal 100.

After receiving the service information (e.g., presence information, and the like) from the VoIP service network 120, the service interworking apparatus 114 enables the service connection to the VoIP terminal 102 by generating signal-converted information from the received service information and transmitting the generated conversion information to the IMS terminal 100.

The service interworking apparatus 114 generates conversion information with respect to the service information for the IMS terminal 100 to transmit over the VoIP network 120. This substitutes the periodic service information provision of the IMS terminal through the wireless connection to the VoIP network.

Herein, the conversion information indicates information reconstructed from the signal for the terminal to allow a terminal not supporting the other service network to acquire the information of the other service network.

Figure 2:
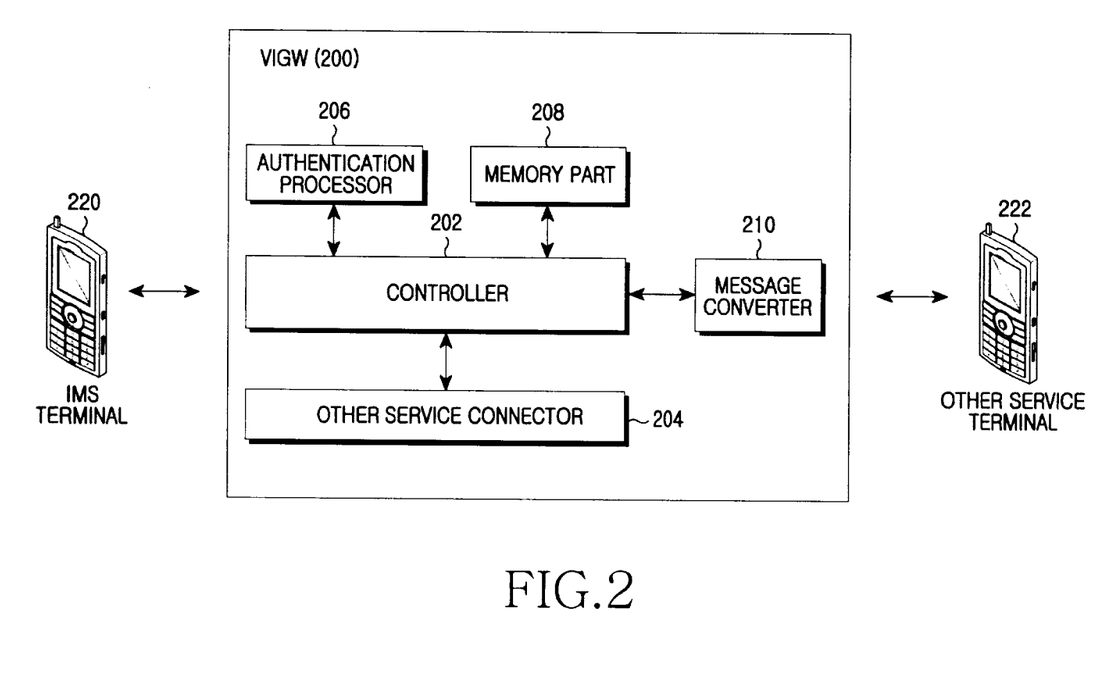
FIG. 2 is a block diagram of a service interworking apparatus according to an exemplary embodiment of the present invention.

FIG. 2 is a block diagram of a service interworking apparatus according to an exemplary embodiment of the present invention.

Referring to FIG. 2, the service interworking apparatus 200 may include a controller 202, an other service connector 204, an authentication processor 206, a memory part 208, and a message converter 210.

The controller 202 of the service interworking apparatus 200 controls overall operations of the service interworking apparatus 200. In more detail, the controller 202 of the service interworking apparatus 200 processes to receive the other services using only the IMS terminal that does not support the other services (e.g., VoIP, and the like).

For doing so, the controller 202 performs the IMS authentication for the IMS IDentifier (ID) in a case of registration with the IMS terminal 220, and maps the other service ID, provided in the process of the registration, and the IMS ID used in the IMS registration when the authentication is completed. Herein, the controller 202 performs those operations to map and manage the information of the IMS service and the other service.

Next, the controller 202 processes to access the corresponding service network using the other service access information received from the IMS terminal 220, generates conversion information to be used at the IMS terminal 220 by converting the information received from the other service network, and processes to transmit the conversion information to the IMS terminal 220.

The authentication processor 206 of the service interworking apparatus 200 performs the authentication with the IMS terminal 220 and the access to the other service network to be used by the IMS terminal 220 under direction of the controller 202.

The memory part 208 stores information required for the registration of the authentication processor 206. The message converter 210 processes to convert the information of the other service network to an IMS signal (SIP message) usable at the IMS terminal 220 under directions of the controller 202.

When the registration with the IMS terminal 220 is completed, the other service connector 204 processes to log on to the other service network using the other service access information provided from the IMS terminal 220 under directions of the controller 202.

By means of the service interworking apparatus constructed as described above, the IMS terminal 220 may receive the corresponding service by connecting to the other service terminal 222.

While the controller 202 of the service interworking apparatus 200 may serve as any or all of the other service connector 204, the authentication processor 206, and the message converter 210, they are separately provided to ease the understanding. However, this is not meant to limit the scope of the invention. One skilled in the art should appreciate that various modifications may be made within the scope of the invention. For example, the controller 202 may process all of the functions of the other service connector 204, the authentication processor 206, and the message converter 210.

So far, the apparatus for providing other VoIP services (Skype, Google talk, and the like) using the terminal which supports the IMS network has been described. Now, an exemplary method for providing other VoIP services (Skype, Google talk, and the like) using the terminal which supports the IMS network at the apparatus will be explained.

Figure 3:
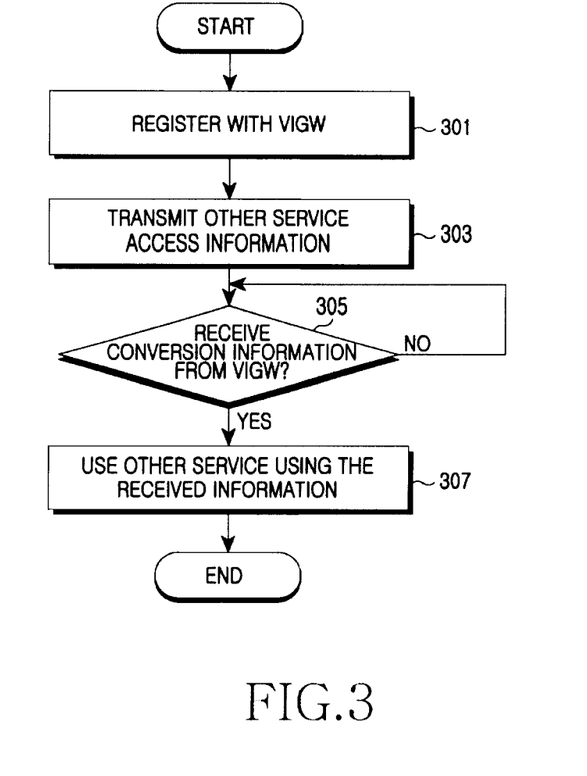
FIG. 3 is a flowchart of operations of a terminal for receiving an interworking service according to an exemplary embodiment of the present invention.

FIG. 3 is a flowchart of operations of a terminal for receiving an interworking service according to an exemplary embodiment of the present invention.

Referring to FIG. 3, it is assumed that the terminal supports only the IMS service, and the user of the terminal is subscribed to VoIP services (Skype, Google talk, and the like) other than the IMS service. Accordingly, the user of the terminal is not serviced through the IMS but can use VoIP, presence, message service, and so on from the currently subscribed VoIP service. While the terminal supports only the IMS service, it provides the user with the same UI as provided by the corresponding VoIP service terminal.

In step 301, the terminal performs registration with the service interworking apparatus. Herein, the registration with the service interworking apparatus registers with the interworking apparatus through the P-CSCF, the terminal requests the registration to the P-CSCF, and the P-CSCF searches an Interrogating-CSCF (I-CSCF) based on the IMS ID.

The P-CSCF sets the Domain Name System (DNS) to make the domain corresponding to the other service subscriber in the network return information of the interworking apparatus (VIGW) from the I-CSCF, and then processes the registration with the service interworking apparatus by transmitting the registration request to the address of the interworking apparatus.

In step 303, the terminal transmits the information for accessing the other services to the service interworking apparatus. Herein, the terminal lets the service interworking apparatus access the corresponding other service using the information in place of the terminal In step 305, the terminal determines whether the conversion information is received from the service interworking apparatus. Herein, the conversion information can be presence information provided in the VoIP service network by converting the information of the other service network to the information suitable for the terminal.

If it is determined in step 305 that the conversion information is not received from the service interworking apparatus, the terminal repeats the step 305.

In contrast, if it is determined in step 305 that the conversion information is received from the service interworking apparatus, the terminal uses the other service using the received information in step 307.

That is, the terminal, which is not supporting the other service network, can obtain the information of the other service network converted by the service interworking apparatus.

Next, the terminal finishes this process.

Figure 4:
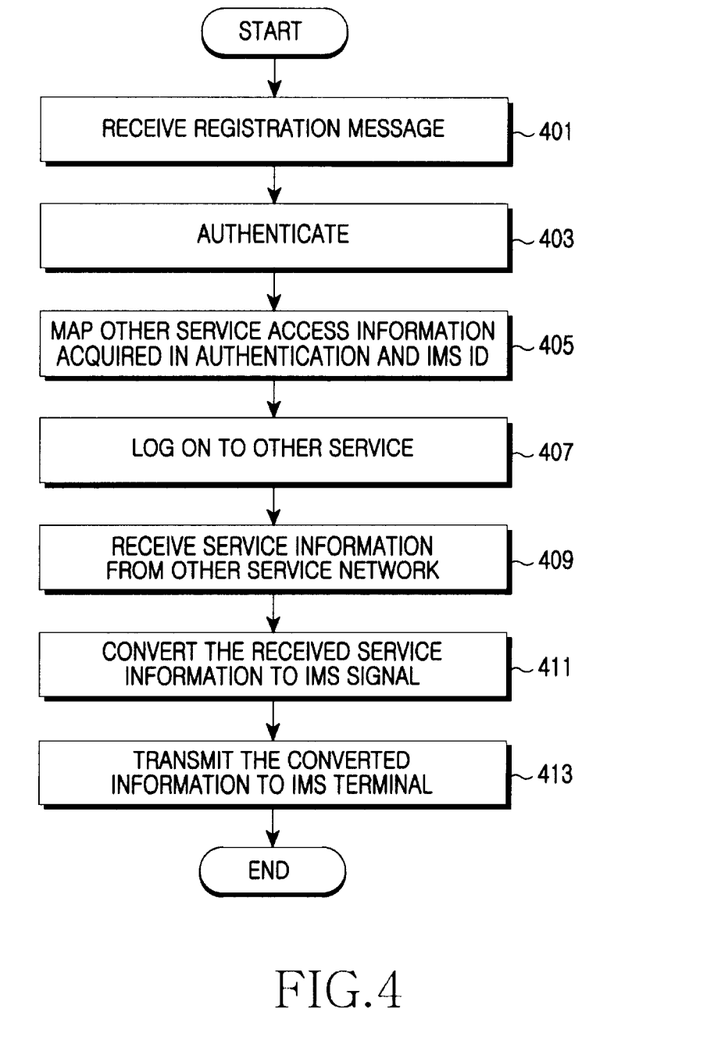
FIG. 4 is a flowchart of a method for providing an interworking service at a service interworking apparatus according to an exemplary embodiment of the present invention.

FIG. 4 is a flowchart of a method for providing an interworking service at a service interworking apparatus according to an exemplary embodiment of the present invention.

Referring to FIG. 4, the interworking service indicates a service which provides a particular service to the terminal that otherwise does not support the particular service.

The service interworking apparatus determines that a service registration message is received from a terminal which intends to receive the other service (e.g., VoIP service, and the like) in step 401.

Herein, the terminal which transmits the service registration message cannot use the other service and the user of the terminal is assumed to be subscribed to the other service.

In step 403, the service interworking apparatus performs authentication with the terminal.

The authentication is the IMS authentication for the terminal which transmits the registration message. The service interworking apparatus which conducts the authentication maps the IMS ID in the registration message received from the terminal and the access information required for the other service access in step 405. In so doing, the access information required for the other service access can be acquired by using the information in the registration message or by using pre-stored access information of the existing access process.

When the authentication is completed, the service interworking apparatus logs on to the other service using the access information required for the other service access received from the terminal in step 407.

After receiving the service information (e.g., presence information, and the like) from the other service network in step 409, the service interworking apparatus generates the conversion information by converting the received service information to the IMS signal in step 411.

Herein, the conversion information indicates information reconstructed from the signal for the terminal to allow a terminal not supporting the other service network to acquire the information of the other service network.

Since the service interworking apparatus converts the service information, such as presence information, received from the terminal so as to support access in the other service network and transmits the conversion information, the periodic provision of the service information from the terminal to the other service network over the radio resources can be addressed.

In step 413, the service interworking apparatus transmits the converted information to the terminal so that the terminal not supporting the other service network can acquire the information of the other service network.

Next, the service interworking apparatus finishes this process.

Figure 5:
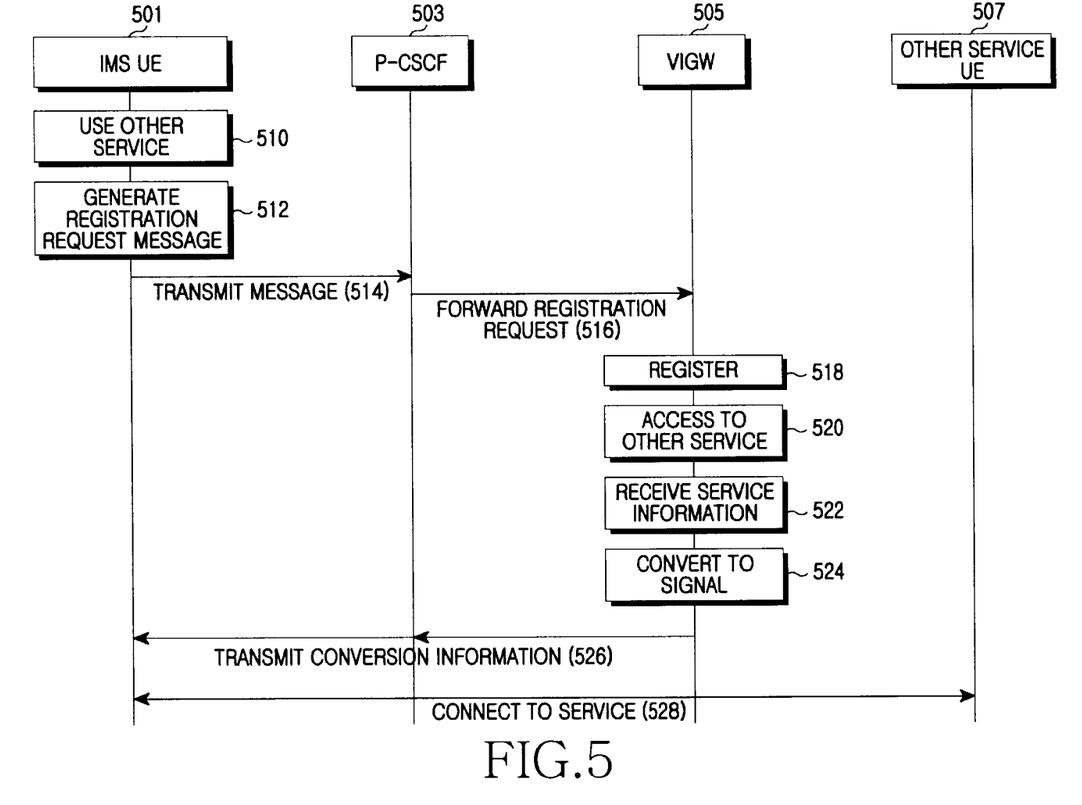
FIG. 5 is a diagram of operations of a mobile communication system for providing an interworking service according to an exemplary embodiment of the present invention.

FIG. 5 depicts operations of a mobile communication system for providing an interworking service according to an exemplary embodiment of the present invention.

Referring to FIG. 5, a mobile communication system includes an IMS terminal 501, a P-CSCF 503, a service interworking apparatus 505, and an other service terminal 507.

The IMS terminal 501 of the mobile communication system is a terminal supporting only the IMS service as described above, and a user of the terminal is assumed to be subscribed to VoIP services (Skype, Google talk, and the like) other than the IMS service. Hence, the user of the terminal is not serviced through the IMS but can use VoIP, presence, and message service provided by the currently subscribed VoIP service. While the terminal supports only the IMS service, it provides the user with the same UI as provided by the corresponding VoIP service terminal.

When it is desired to use the interworking service, that is, the other service, at the IMS terminal 501 in step 510, the IMS terminal 501 registers with the interworking apparatus 505 through the P-CSCF 503. For the registration, the IMS terminal 501 generates a registration request message in step 512 and transmits the generated message to the P-CSCF 503 in step 514. The P-CSCF 503 sets the DNS to let the domain corresponding to the other service subscriber in the network return information of the service interworking apparatus (VIGW) from the I-CSCF, and then forwards the message received from the terminal 501 to the service interworking apparatus 505 with the address of the interworking apparatus 505 in step 516.

Hence, the service interworking apparatus 505 performs the registration to verify the IMS authentication for the terminal 501 which transmits the registration message in step 518. When the registration is completed, the service interworking apparatus 505 accesses the other service network in step 520. Herein, the access to the other service network indicates the log-on to the other service using the access information required for the other service access received from the terminal 501.

After receiving the service information (e.g., presence information, and the like) from the other service network in step 522, the service interworking apparatus 505 generates the conversion information by converting the received service information to a signal in step 524.

Herein, the conversion information indicates information reconstructed from the signal for the terminal so as to allow a terminal not supporting the other service network to acquire the information of the other service network.

Since the service interworking apparatus 505 converts the service information, such as presence information, received from the terminal so as to support access in the other service network and transmits the conversion information, the periodic provision of the service information from the terminal 501 to the other service network over the radio resources can be addressed.

Next, the service interworking apparatus 505 transmits the conversion information to the terminal 501 so that the terminal not supporting the other service network can acquire the information of the other service network in step 526.

Thus, the IMS terminal 501 connects the service to the other service terminal 507 in step 528.

As set forth above, the apparatus and the method according to exemplary embodiments of the present invention provide other VoIP services (Skype, Google talk, and the like) using the terminal which supports the IMS network. By accessing the VoIP network through the authentication of the IMS network and the VoIP network, the other VoIP services can be used at the IMS terminal without having to use a high-priced VoIP service dedicated terminal which requires high performance. Therefore, the other VoIP services can be used at moderate prices.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for providing other services in an Internet Protocol (IP) Multimedia Subsystem (IMS), the apparatus comprising:
   a service interworking apparatus configured to enable communication between a Voice over IP (VoIP) service network and an IMS terminal connected to the service interworking apparatus through an IMS network by converting information received from the VoIP service network to information supportable by the IMS terminal to interwork the IMS terminal and other VoIP services not supported by the IMS terminal, and by converting information received from the IMS terminal to information supportable by the VoIP service network,
   wherein the service interworking apparatus is configured to interwork the IMS terminal and the other VoIP service not supported by the IMS terminal by:
      receiving a registration request message from the IMS terminal;
      upon receipt of the registration request message, performing a registration to verify IMS authentication for the IMS terminal;
      mapping access information for the other VoIP services and information of the IMS terminal; and
      logging on for the other VoIP services using the access information.

2. The apparatus of claim 1, wherein the access information for the other VoIP services is included in the registration request message.

3. The apparatus of claim 2, wherein the service interworking apparatus is configured to access a corresponding VoIP service using the access information for the other VoIP services.

4. The apparatus of claim 2, wherein the IMS terminal is configured to register to the service interworking apparatus using the registration request message, to send service information to transmit to the VoIP service network to the service interworking apparatus, and to receive service information provided from the VoIP service network from the service interworking apparatus.

5. The apparatus of claim 1, wherein the service interworking apparatus comprises a message converter configured to convert the information of the VoIP service network to an IMS signal usable at the IMS terminal.

6. The apparatus of claim 5, wherein the IMS signal comprises a Session Initiation Protocol (SIP) message.

7. A method for providing other services in an Internet Protocol (IP) Multimedia Subsystem (IMS), the method comprising:
   establishing a connection between a service interworking apparatus and an IMS terminal connected to the service interworking apparatus through an IMS network;
   establishing a connection between the service interworking apparatus and a Voice over IP (VoIP) service network;
   receiving, by the service interworking apparatus, a registration request message from the IMS terminal;
   upon receipt of the registration request message, performing, by the service interworking apparatus, a registration to verify IMS authentication for the IMS terminal;
   mapping, by the service interworking apparatus, access information for the other VoIP services and information of the IMS terminal;
   logging on, by the service interworking apparatus, for the other VoIP services using the access information;

converting, by the service interworking apparatus, information received from the VoIP service network to information supportable by the IMS terminal and transmitting the converted information to the IMS terminal to interwork the IMS terminal and other VoIP services not supported by the IMS terminal; and converting, by the service interworking apparatus, information received from the IMS terminal to information supportable by the VoIP service network and transmitting the converted information to the VoIP service network.

8. The method of claim 7, wherein the access information of the other VoIP services is included in the registration request message.

9. The method of claim 8, wherein the service interworking apparatus is configured to access a corresponding VoIP service using the access information for the other VoIP services.

10. The method of claim 8, wherein the IMS terminal is configured to register to the service interworking apparatus using the registration request message, after registering to the service interworking apparatus, to send service information to transmit to the VoIP service network to the service interworking apparatus, and to receive service information provided from the VoIP service network from the service interworking apparatus.

11. The method of claim 7, wherein the converting of, by the service interworking apparatus, the information received from the Voice over IP (VoIP) service network to the information supportable by an IMS terminal comprises converting the information of the VoIP service network to an IMS signal usable at the IMS terminal.

12. The method of claim 11, wherein the IMS signal comprises a Session Initiation Protocol (SIP) message.

13. The method of claim 7, wherein the IMS terminal displays a User Interface (UI) that is substantially the same as the UI otherwise provided by a VoIP service terminal.

14. A method for providing other services in an Internet Protocol (IP) Multimedia Subsystem (IMS) for enabling communication between a Voice over IP (VoIP) service network and an IMS terminal connected to a service interworking apparatus through an IMS network, the method comprising:

generating, by an IMS terminal, a registration request message for registering the IMS terminal with a service interworking apparatus;

transmitting, by the IMS terminal, the generated request message to the service interworking apparatus through a Proxy-Call Session Control Function (P-CSCF);

receiving, by the IMS terminal, a signal, which is indicating information reconstructed to the signal for the IMS terminal so as to allow the IMS terminal not supporting the VoIP service network to acquire the information of the VoIP service network, from the service interworking apparatus through P-CSCF; and connecting, by the IMS terminal, the VoIP service network, wherein the service interworking apparatus is configured to receive the registration request message from the IMS terminal, upon receipt of the registration request message, to perform a registration to verify IMS authentication for the IMS terminal, to map access information for the other VoIP services and information of the IMS terminal, to log on for the other VoIP services using the access information, to receive service information, and to generate the converted information by converting the received service information to the signal.

15. The method of claim 14, wherein the registration request message includes access information for accessing the VoIP service network.

* * * * *